United States Patent
Seok (10) Patent No.: US 9,577,838 B2
(45) Date of Patent: Feb. 21, 2017

(54) DEVICE AND METHOD FOR MULTICAST IN WIRELESS LOCAL ACCESS NETWORK

(75) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1070 days.

(21) Appl. No.: 12/463,149

(22) Filed: May 8, 2009

(65) Prior Publication Data

US 2009/0279470 A1    Nov. 12, 2009

(30) Foreign Application Priority Data

May 9, 2008    (KR) .................. 10-2008-0043548

(51) Int. Cl.

| | |
|---|---|
| H04L 12/761 | (2013.01) |
| H04L 12/18 | (2006.01) |
| H04L 1/16 | (2006.01) |
| H04L 1/00 | (2006.01) |
| H04W 74/08 | (2009.01) |
| H04W 76/00 | (2009.01) |

(52) U.S. Cl.
CPC .......... *H04L 12/189* (2013.01); *H04L 1/1685* (2013.01); *H04L 12/1868* (2013.01); *H04L 2001/0093* (2013.01); *H04W 74/08* (2013.01); *H04W 76/002* (2013.01)

(58) Field of Classification Search
None
See application file for complete search history.

(56) References Cited

U.S. PATENT DOCUMENTS

| | | | | |
|---|---|---|---|---|
| 7,280,495 | B1* | 10/2007 | Zweig et al. | 370/312 |
| 7,626,968 | B2* | 12/2009 | Adachi et al. | 370/338 |
| 7,675,911 | B2* | 3/2010 | Singh et al. | 370/389 |
| 8,023,453 | B2* | 9/2011 | Sammour et al. | 370/328 |
| 2005/0160345 | A1 | 7/2005 | Walsh et al. | |
| 2005/0265298 | A1* | 12/2005 | Adachi et al. | 370/338 |
| 2006/0023715 | A1 | 2/2006 | Chen et al. | |
| 2006/0034274 | A1* | 2/2006 | Kakani | H04L 1/0079 370/389 |

(Continued)

FOREIGN PATENT DOCUMENTS

| | | |
|---|---|---|
| WO | WO 2004/023736 A1 | 3/2004 |
| WO | WO 2005/065035 A2 | 7/2005 |

(Continued)

*Primary Examiner* — Duc Duong
(74) *Attorney, Agent, or Firm* — Birch, Stewart, Kolasch & Birch, LLP (57) ABSTRACT

A device and method for multicasting data in a wireless network. The method includes receiving multicast data at a specific node of the wireless network, the multicast data including a multicast acknowledgement request; and determining by the specific node whether or not the specific node is requested to send an acknowledgement to the multicast acknowledgement request. Also, a device and method for multicasting data in a wireless network. The method includes transmitting multicast data, the multicast data including a multicast acknowledgement request, the multicast acknowledgement request including information configured to enable a specific node of the wireless network to determine whether or not the specific node is requested to send an acknowledgement to the multicast acknowledgement request.

6 Claims, 8 Drawing Sheets

(56) References Cited

U.S. PATENT DOCUMENTS

| | | | |
|---|---|---|---|
| 2006/0034277 A1* | 2/2006 | Jang | H04L 1/1614 370/389 |
| 2006/0083233 A1* | 4/2006 | Nishibayashi | H04L 1/1621 370/389 |
| 2006/0107166 A1* | 5/2006 | Nanda | H04B 7/0417 714/748 |
| 2007/0030819 A1* | 2/2007 | Bichot et al. | 370/315 |
| 2007/0186134 A1* | 8/2007 | Singh et al. | 714/749 |
| 2007/0189207 A1* | 8/2007 | Sammour | H04L 1/1614 370/328 |
| 2007/0258466 A1* | 11/2007 | Kakani | H04L 1/1614 370/395.53 |
| 2007/0261091 A1 | 11/2007 | Tachikawa | |
| 2008/0019307 A1 | 1/2008 | Tenny et al. | |
| 2008/0130538 A1* | 6/2008 | Raissinia | H04W 28/06 370/310 |
| 2008/0212612 A1* | 9/2008 | Singh | H04L 1/1614 370/474 |

FOREIGN PATENT DOCUMENTS

| | | |
|---|---|---|
| WO | WO 2007/090992 A2 | 8/2007 |
| WO | WO 2008/020731 A1 | 2/2008 |

* cited by examiner

DEVICE AND METHOD FOR MULTICAST IN WIRELESS LOCAL ACCESS NETWORK

CROSS-REFERENCE TO RELATED APPLICATIONS

This application claims the benefit of priority of Korean Patent Application No. 10-2008-0043548 filed on May 9, 2008, which is incorporated by reference in its entirety herein.

BACKGROUND OF THE INVENTION

1. Field of the Invention

The present invention relates to wireless communication and, more particularly, to a multicast or broadcast method, and a device supporting the method in a wireless local access network (WLAN).

2. Discussion of the Related Art

Recently, diverse wireless communication technologies have come under development in line with the advancement of information communication technology. The wireless local access network (WLAN) technologies allow mobile terminals such as personal digital assistants (PDAs), laptop computers, portable multimedia players (PMPs), and the like, to wirelessly access the high speed Internet at homes or offices or in a particular service providing area based on a radio frequency technology.

In a WLAN, message or frame transmissions may be divided into a unicast transmission, a multicast transmission, and a broadcast transmission depending on the number of target devices or destination devices. Whereas the unicast transmission is aimed for only a single target device of a transmission frame, the multicast and broadcast transmissions are used when a plurality of terminals are target devices of a transmission message. In multicast, a target address or a destination address of a transmission frame is specified as a multicast group address, and broadcast is a special multicast in which the multicast group address specifies every terminal within a certain coverage. Thus, although 'multicast' is simply referred to hereinafter, it should be construed to include 'broadcast' except for a case not allowed in its properties.

Multicast simultaneously transmits the same frame to a plurality of destination terminals, having an advantage of reducing traffic and effectively using channels. With such advantages, multicast may be effectively used for various applications, for example, providing video conference, corporate communication, distance learning, software distribution, or various information such as stock quotes, news items, and the like. Further, multicast may be used for an application allowing a plurality of users to play games or share streaming data in wireless home network.

Multicast is based on a group of reception terminals interested in a particular data stream, namely, based on the concept of a multicast group. If terminals are interested to receive multicast data, the terminals should first join a corresponding multicast group to receive the data. The multicast group is specified by a multicast medium access control (MAC) address in a MAC layer. In general, an upper layer of the MAC layer is accountable for generating, joining, seceding, and changing of the multicast group.

Meanwhile, in the multicast service, it is difficult to confirm whether or not a terminal joined the corresponding multicast group, namely, a destination terminal, has successfully received every data provided from a source terminal. In particular, IEEE (Institute of Electrical and Electronic Engineers) 802.11 standard does not define an error recovery mechanism with respect to multicast traffic. Namely, the current IEEE 802.11 standards use an open-loop multicast transmission, without receiving any feedback information from the reception terminal regarding the multicast traffic. As a result, in the current WLAN, the reception terminal, namely, the target terminal, of the multicast traffic, it is not guaranteed to completely and reliably receive data transmitted in the multicast manner.

In addition, the current WLAN standard does not support retransmission, exponential backoff, and physical layer (PHY) rate adaptation with respect to a multicast frame. For example, in the case of the unicast transmission, whether or not a frame has been received is checked through an acknowledgement (ACK) frame. If no ACK frame is received, the source terminal transmits the same frame again. In this case, a contention window is exponentially increased to achieve fair throughput with other neighbor terminals, and the source terminal adjusts the physical layer rate based on a frame error rate. In contrast, however, the current multicast service does not support protocols comparable to those used in a unicast transmission, thus having a difficulty in providing quality of service (QoS) and achieving fairness of throughput among terminals.

Thus, in the conventional multicast service, the probability of losing a transmission frame due to interference, collision, time-varying channel characteristics, and the like, increases. In addition, the conventional multicast service does not use a data retransmission mechanism and does not support the exponential backoff and the physical layer rate adjustment. Thus, the reliability of the multicast traffic is inferior to the reliability of unicast traffic, and fairness of throughput among terminals is not readily achieved. In addition, in the conventional multicast transmission, generally, the physical layer rate is set to be low. Accordingly, transmission throughput of the multicast service is low.

SUMMARY OF THE INVENTION

An embodiment of the present invention provides a multicast procedure and device capable of improving transmission reliability of multicast traffic in a wireless local area network (WLAN), and a station supporting the multicast procedure.

An embodiment of the present invention also provides a multicast procedure and device capable of achieving fairness of transmission throughput among multicast service terminals in a WLAN, and also achieving fairness of transmission throughput with a unicast service, and a station supporting the multicast procedure.

An embodiment of the present invention also provides a multicast procedure and device in a WLAN capable of effectively providing a service by reflecting the characteristics of multicast traffic, and a station supporting the multicast procedure.

In one embodiment, there is a method for multicasting data in a wireless network, including: receiving multicast data at a specific node of the wireless network, the multicast data including a multicast acknowledgement request; and determining by the specific node whether or not the specific node is requested to send an acknowledgement to the multicast acknowledgement request.

The method may also include transmitting the acknowledgement if the step of determining determines that the specific node is requested to send the acknowledgement.

The method may also include determining whether an address uniquely assigned to the specific node or a group address encompassing the address uniquely assigned to the specific node is included in the multicast acknowledgement request.

The method may also include, if the group address encompassing the address uniquely assigned to the specific node is included in the multicast acknowledgement request, determining whether or not a unique identifier assigned to the specific node is also included in the multicast acknowledgement request.

The method may also include transmitting the acknowledgement in accordance with a predetermined timing scheme configured to deconflict acknowledgement transmissions of all nodes identified in the multicast acknowledgement request.

The method may also include determining a transmission order number; and transmitting the acknowledgement in accordance with the determined order number.

The method may also include ranking all unique identifiers listed in the acknowledgement request with integer numbers N in numerical order, with a lowest unique identifier being assigned N=0, and wherein the step of transmitting the acknowledgement in accordance with the determined order number comprises transmitting the acknowledgement after a delay of (N+1)*SIFS+N*TxTIME, where SIFS is a short inter-frame space corresponding to a predetermined interval between frames, and TxTIME is a transmission time of a corresponding acknowledgement frame.

The multicast acknowledgement may be one of a positive and a negative acknowledgement.

In another embodiment, there is a method for multicasting data in a wireless network, including: transmitting multicast data, the multicast data including a multicast acknowledgement request, the multicast acknowledgement request including information configured to enable a specific node of the wireless network to determine whether or not the specific node is requested to send an acknowledgement to the multicast acknowledgement request.

The multicast acknowledgement request may include one of an address uniquely assigned to the specific node or a group address encompassing the address uniquely assigned to the specific node.

If the group address is included in the multicast acknowledgement request, the multicast acknowledgement request may include a unique identifier assigned to each of plural specific nodes of the group address from which the acknowledgement is requested.

The method may also include receiving an acknowledgement from the specific node in accordance with a predetermined timing scheme configured to deconflict acknowledgement transmissions of the plural specific nodes.

The method may also include receiving the acknowledgement after a delay of (N+1)*SIFS+N*TxTIME, where N is a unique integer number assigned in numerical order to each of the plural nodes, with a lowest unique identifier being assigned N=0, where SIFS is a short inter-frame space corresponding to a predetermined interval between frames, and TxTIME is a transmission time of a corresponding acknowledgement frame.

The multicast acknowledgement may be one of a positive and a negative acknowledgement.

In another embodiment, there is an apparatus for receiving multicast data in a wireless network. The apparatus includes a transceiver; a memory; and a processor operatively connected to the transceiver and the memory, the processor configured to receive multicast data, the multicast data including a multicast acknowledgement request; and determine whether or not the apparatus is requested to send an acknowledgement to the multicast acknowledgement request.

The processor may be configured to transmit the acknowledgement if the processor determines that the apparatus is requested to send the acknowledgement.

The processor may be configured to determine whether an address uniquely assigned to the apparatus or a group address encompassing the address uniquely assigned to the apparatus is included in the multicast acknowledgement request.

If the group address encompassing the address uniquely assigned to the apparatus is included in the multicast acknowledgement request, the processor may be configured to determine whether or not a unique identifier assigned to the apparatus is also included in the multicast acknowledgement request.

The processor may be configured to transmit the acknowledgement in accordance with a predetermined timing scheme configured to deconflict acknowledgement transmissions of all nodes identified in the multicast acknowledgement request.

The processor may be configured to determine a transmission order number; and transmit the acknowledgement in accordance with the determined order number.

The processor may be configured to rank all unique identifiers listed in the acknowledgement request with integer numbers N in numerical order, with a lowest unique identifier being assigned N=0, or transmit the acknowledgement after a delay of (N+1)*SIFS+N*TxTIME, where SIFS is a short inter-frame space corresponding to a predetermined interval between frames, and TxTIME is a transmission time of a corresponding acknowledgement frame.

The multicast acknowledgement may be one of a positive and a negative acknowledgement.

In another embodiment, there is an apparatus for multicasting data in a wireless network. The apparatus includes a transceiver; a memory; and a processor operatively connected to the transceiver and the memory, the processor configured to transmit multicast data, the multicast data including a multicast acknowledgement request, the multicast acknowledgement request including information configured to enable a specific node of the wireless network to determine whether or not the specific node is requested to send an acknowledgement to the multicast acknowledgement request.

The multicast acknowledgement request may include one of an address uniquely assigned to the specific node or a group address encompassing the address uniquely assigned to the specific node.

If the group address is included in the multicast acknowledgement request, the multicast acknowledgement request may include a unique identifier assigned to each of plural specific nodes of the group address from which the acknowledgement is requested.

The processor may be configured to receive an acknowledgement from the specific node in accordance with a predetermined timing scheme configured to deconflict acknowledgement transmissions of the plural specific nodes.

The processor may be configured to receive the acknowledgement after a delay of (N+1)*SIFS+N*TxTIME, where N is a unique integer number assigned in numerical order to each of the plural nodes, with a lowest unique identifier being assigned N=0, where SIFS is a short inter-frame space corresponding to a predetermined interval between frames, and TxTIME is a transmission time of a corresponding acknowledgement frame.

The multicast acknowledgement may be one of a positive and a negative acknowledgement.

DESCRIPTION OF EXEMPLARY EMBODIMENTS

A multicast procedure and corresponding device for supporting the multicast procedure according to exemplary embodiments of the present invention will now be described in detail with reference to the accompanying drawings. In the following description, a wireless local area network (WLAN) system as a wireless communication system will be taken as an example. But this is merely illustrative and the present invention can be applicable in the same manner to any other wireless communication systems besides the WLAN system except for a case not allowed in terms of its properties. Terms or words unique to the WLAN system used in the embodiments of the present invention may be properly changed to other terms or words commonly used in a corresponding wireless communication system.

Figure 1:
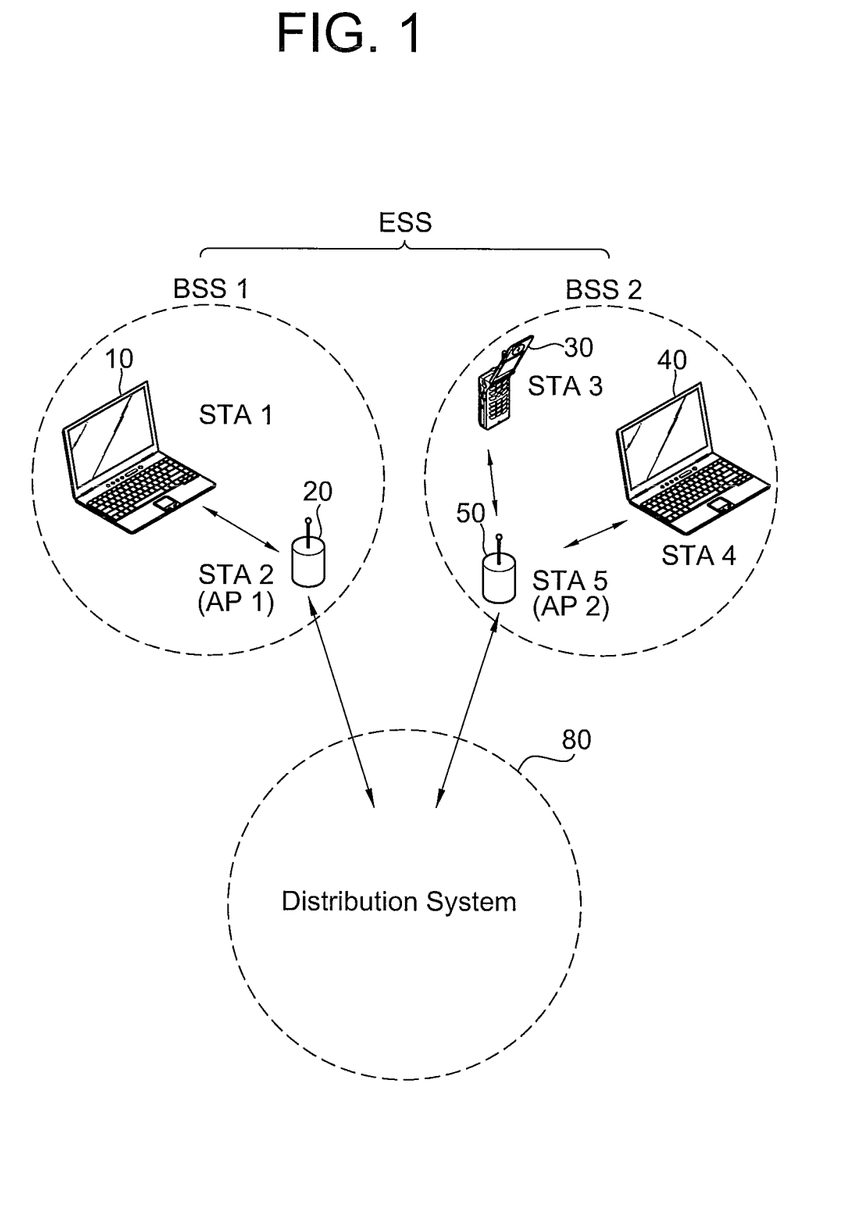
FIG. 1 illustrates an exemplary WLAN system capable of implementing embodiments of the present invention.

FIG. 1 illustrates a WLAN system for implementing embodiments of the present invention. The WLAN system includes one or more basic service sets (BSSs). The BSS refers to a set of stations (STA) that can communicate with each other in synchronization, which does not indicate a particular area. The BSS may be classified into an infrastructure BSS and an independent BSS (IBSS). FIG. 1 shows the infrastructure BSS. The infrastructure BSS include one or more STAs. A first BSS BSS1 includes STA1 10, and STA2 20. A second BSS BSS2 includes STA3 30, STA4 40 and STA5 50. In each infrastructure BSS, at least one access point (AP) may exist. The AP is a station for providing a distribution service. The STA2 20 in the first BSS BSS1 may be a AP1 and the STA5 50 in the first BSS BSS2 may be a AP2. A distribution system (DS) 80 connects a plurality of APs (AP1 and AP2). Meanwhile, the IBSS, not including an AP, includes STAs, all of which are mobile stations, and forms a self-contained network without allowing a connection to the DS 80.

The STA is a certain function medium including a medium access control (MAC) following the stipulation of IEEE 802.11 standard and a physical layer interface with respect to a wireless medium. The STA may be called as a node. The STA may be an AP or non-AP. A STA for wireless communication may include a processor, a transceiver, and the like. The processor is a function unit configured to generate a frame to be transmitted via a wireless network or process a frame received via the wireless network, and performs various functions to control the station. The transceiver, which is functionally coupled with the processor, is configured to transmit and/or receive frames via the wireless network for the STA.

Non-AP STAs (STA1 10, STA3 30, STA4 40, STA6 60, STA7 70, and STA8 80) may be a mobile terminal manipulated by a user. The non-AP STA may be referred to by other names such as wireless transmit/receive unit (WTRU), user equipment (UE), mobile station (MS), mobile terminal, mobile subscriber unit, or the like.

The APs (AP1 and AP2) provide an access to the DS 80 by way of a wireless medium for STAs associated thereto. In the infrastructure BSS including the AP, communication between non-AP STAs is made by way of the AP, but when a direct link has been established, the non-AP STAs can directly communicate with each other. The AP may be also called by other names such as centralized controller, base station (BS), node-B, base transceiver system (BTS), site controller, and the like.

A plurality of infrastructure BSSs may be connected via the DS 80. The plurality of BSSs connected via the DS 80 is called an extended service set (ESS). STAs included in the ESS may communicate with each other, and the non-AP STA may move from one BSS to another BSS in the same ESS while seamlessly performing communication.

The DS 80 is a mechanism allowing one AP to communicate another AP. Through the DS 80, an AP can transmit a frame for STAs associated to the BSS managed by the AP, transfer a frame when one STA moves to another BSS, or transmit or receive frames to and from an external network such as a wired network. The DS 80 is not necessarily a network. Namely, the DS 80 is not limited to any form so long as it can provide a certain distribution service defined in IEEE 802.11 standard. For example, the DS 80 may be a wireless network such as a mesh network or a physical structure connecting the APs.

According to an embodiment of the present invention, there is a receiver initiated multicast transmission method that is used to provide improved multicast services. The 'receiver initiated' means that a multicast receiver requests retransmission of multicast data from a multicast originator. An STA, among one or more multicast receivers, that has not successfully received a multicast frame transmits a trigger frame to the multicast originator for triggering retransmission of the multicast frame. Meanwhile, in a sub-embodiment, a STA that has successfully received the multicast frame does not transmit an acknowledgement (ACK) frame nor any other types of frames.

The above-described multicast procedure may differ depending on whether or not a multicast frame is associated with a delay sensitive application or a delay insensitive application. In the case of the delay sensitive application, a negative ACK mechanism is applied to each transmitted multicast frame. On the contrary, in case of the delay insensitive application, a block ACK mechanism is introduced to apply a negative ACK application to a plurality of transmitted multicast frames. There is no limitation to the reference for discriminating the delay sensitive application and the delay insensitive application. The applications will now be described in detail.

Delay Sensitive Application

In the case of the delay sensitive application, the multicast originator transmits a data frame in a multicast frame in a multicast manner. Among the plurality of multicast receivers, a STA that has successfully received the data frame does not transmit an acknowledgement message (ACK frame) to the multicast originator, as in the conventional multicast procedure. Meanwhile, a STA that has not successfully received the multicast data transmits a negative ACK frame to the multicast originator to trigger retransmission of the data frame. The negative ACK frame may be a null data frame. By using the null data frame, because the existing frame is used, there is no burden of defining a new type of frame.

The process of transmitting by the multicast originator a multicast frame, and the process of transmitting by the STA that has not successfully received the multicast frame the null data frame to trigger retransmission of the multicast frame, will now be described.

Figure 2:
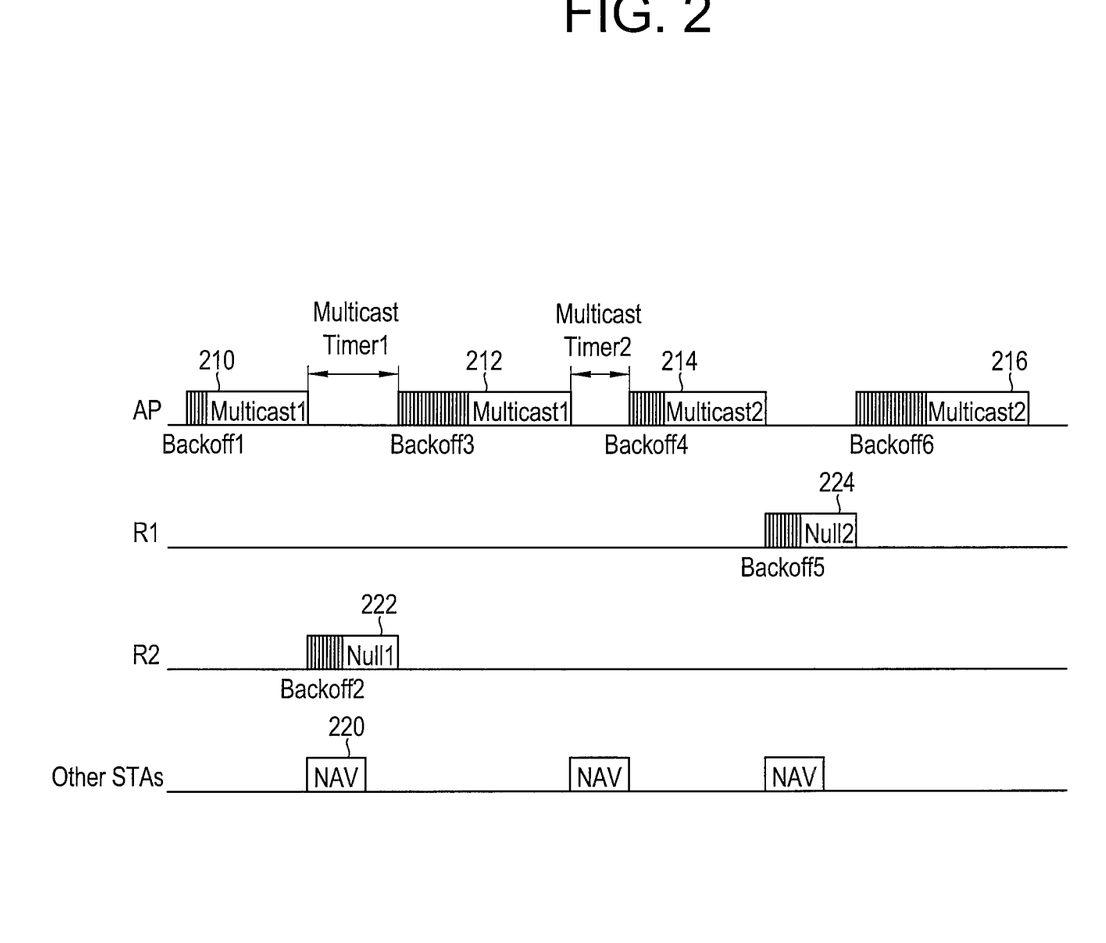
FIG. 2 is a timing diagram illustrating a trigger initiated multicast transmission procedure in a delay sensitive application according to an embodiment of the present invention.

FIG. 2 is a timing diagram illustrating a trigger initiated multicast transmission procedure in the delay sensitive application according to an embodiment of the present invention. An AP, namely, the multicast originator, multicasts a first data frame Multicast1 210 after a backoff (Backoff1) of a certain time duration. The first data frame Multicast1 210 is a frame corresponding to one-time transmission unit of the multicast stream and may be a single data frame or a frame obtained by adding a plurality of data frames according to a method such as an aggregation or the like.

Figure 3:
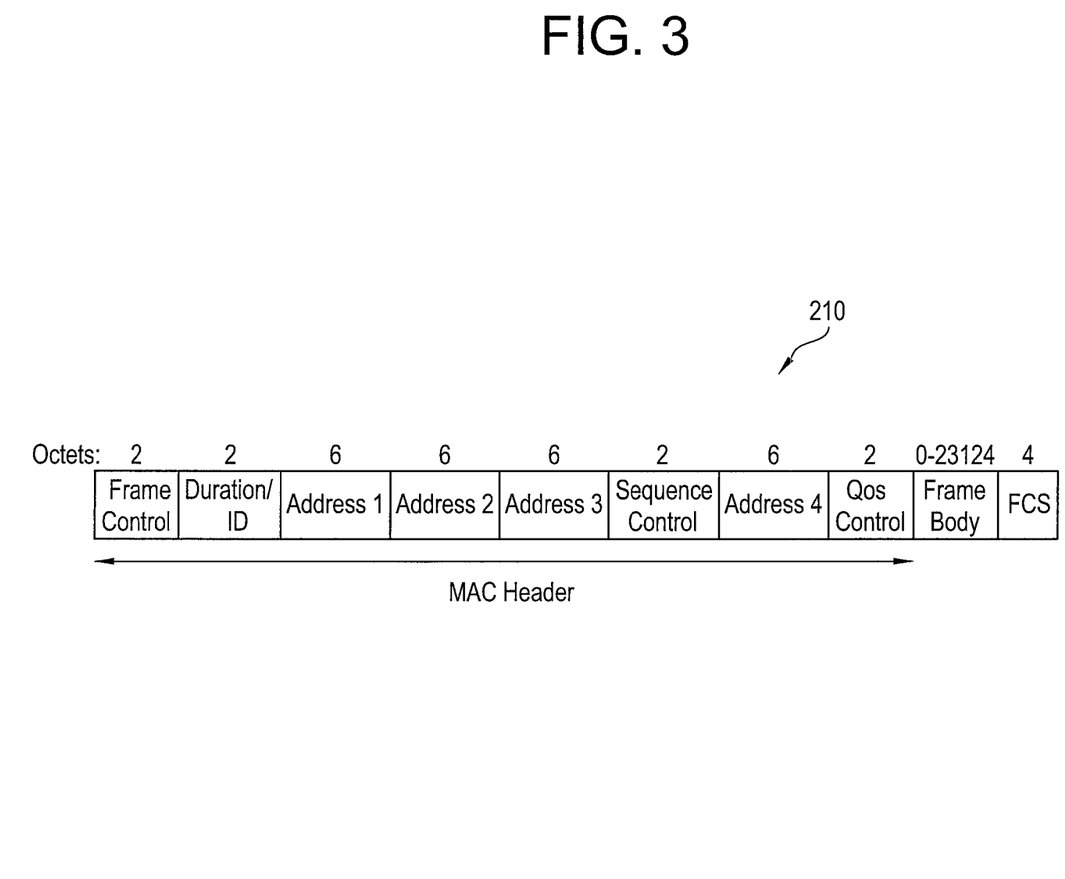
FIG. 3 illustrates an example of a format of a first data frame.

FIG. 3 illustrates an example of the format of the first data frame Multicast1 210. The first data frame Multicast1 210 includes a medium access control (MAC) header, and a frame body. The first data frame Multicast1 210 may further include a frame check sequence (FCS). In this example, the frame format of the first data frame Multicast1 210 is dependent upon a quality of service (QoS) subfield of a sub-type field. The first data frame Multicast1 210 is described in detail in IEEE P802.11-REVma/D9.0 specification, the contents of which being hereby incorporated by reference. The format of a null data frame (to be described) may be the same as that illustrated in FIG. 3, with the frame body of the null data frame not including any data.

A Duration/ID field in the MAC header of the first data frame Multicast1 210 may be set as a certain value, but not zero (0). The value of the Duration/ID field may be used for two purposes. Hereinafter, the purposes of the Duration/ID field will now be described.

First, for the STAs other than the receivers (R1 and R2) of the multicast frame, the value of the Duration/ID field may be used to inform the other STAs about a network allocation vector (NAV). Here, the other STAs cannot access a channel during the period allocated by the NAV. Meanwhile, for the receivers R1 and R2 of the first data frame Multicast1 210, the value of the Duration/ID field is used to inform the receivers R1 and R2 about the size of a contention window for transmitting a negative ACK frame.

After the AP multicasts the first data frame Multicast1 210, it is assumed that the receiver R1 has successfully received the first data frame Multicast1 210, the receiver R2 has not successfully received the first data frame Multicast1 210, and the other STAs are not the receivers of the first data frame Multicast1 210.

The other STAs set the value of the Duration/ID field of the data frame, as the NAV 220. Thus, the other STAs do not attempt channel access during the period defined by the NAV. The receiver R1 that has successfully received the first data frame Multicast1 210, extracts a multicast address, a sequence number, a traffic identifier (TID), and the like, from the received first data frame Multicast1 210 and stores them in a temporary memory (i.e., cache) or the like. The receiver R2 that has received a damaged multicast frame or that has not received the multicast frame may determine that a channel is available after a backoff of certain time duration, and may transmit a negative ACK frame, i.e., a null data frame 222, to the AP that is the multicast originator.

In case where one or more STAs have not successfully received the multicast data frame, the multicast receivers perform backoff (Backoff2) before transmitting the null data frame 222 in order to prevent collision between the transmitted null data frames. As described above, the contention window for backoff does not exceed the value set in the Duration/ID field of the first data frame Multicast1 210. A transmission priority of the null data frame 222 may be set to be higher than other frames.

Information for identifying the first data frame Multicast1 210 that is the subject of a retransmission request is included in the null data frame 222. For example, the third address field (Address 3) in the MAC header part of the null data frame 222 may be set as the corresponding multicast address. And a sequence control field of the null data frame 222 may be set to have the same value as the sequence control field of the retransmission-desired multicast data, namely, the first data frame Multicast1 210. If any other STA first accesses the channel to transmit the null data frame 222 before the STA R2 transmits the null data frame 222 during the backoff, transmission of the null data frame 222 on the backoff is canceled. And the STA R2 may perform backoff again to transmit the null data frame 222 to the multicast originator within the period (i.e., the period set in the Duration/ID field) of the contention window.

After transmitting the first multicast frame Multicast1 210, the multicast originator AP may set a multicast timer (Multicast Timer1). The multicast timer may set a time duration identifying when a next data frame 212 is transmitted after the first data frame Multicast1 210 has been multicast. The value of the multicast timer (Multicast Timer1) may correspond to the sum of a value set in the Duration/ID field of the corresponding multicast frame Multicast1 210 and an interval between frames, e.g., a short inter-frame space (SIFS).

After the multicast timer (Multicast Timer1) expires, the AP retransmits the first data frame Multicast1 212 if the null data frame 222 requesting retransmission of the first data frame Multicast1 210 is received from the receiver R2 before the multicast timer (Multicast Timer1) expires. In the case as illustrated in FIG. 2, after the first multicast frame Multicast1 210 is transmitted, the null data frame 222 is received from the receiver R2, so the AP multicasts again the first data frame Multicast1 212 after a certain backoff (Backoff3) after the multicast timer (Multicast Timer 1) expires.

After the AP retransmits the first data frame Multicast1 212, if it does not receive a null data frame from the multicast receivers (R1 and/or R2) during a certain period (i.e., during a set time period of a second multicast timer (Multicast Timer2), the AP multicasts the second data frame Multicast2 214 after a backoff (Backoff4) during a certain time period. Namely, after the second multicast timer (Multicast Timer2) expires, the AP multicasts the second data frame Multicast2 214 according to a general procedure. The follow-up process is performed in the same manner as the process after the first data frame Multicase2 210 is transmitted. In the case illustrated in FIG. 2, the first receiver R1, which has failed to successfully receive the second data frame Multicast2 214, transmits the null data frame 224 requesting retransmission to the AP, the multicast originator after the backoff (Backoff5). This is merely illustrative. Upon receiving the null data frame 214 from the first receiver R1, the AP multicasts again the second data frame Multicast2 216 after a certain backoff (Backoff6).

Delay Insensitive Application

In case of a delay insensitive application, a negative block ACK mechanism is used. The multicast originator sequentially multicasts a plurality of data frames, namely, a plurality of multicast frames, at certain intervals. Thereafter, in order to check whether or not the multicast receivers have successfully received the plurality of data frames, the multicast originator transmits a multicast block ACK request frame. Among those who have received the multicast block ACK request frame, only a multicast receiver(s) who has failed to successfully receive one or more of the plurality of multicast frames transmits a multicast block ACK frame.

Figure 4:
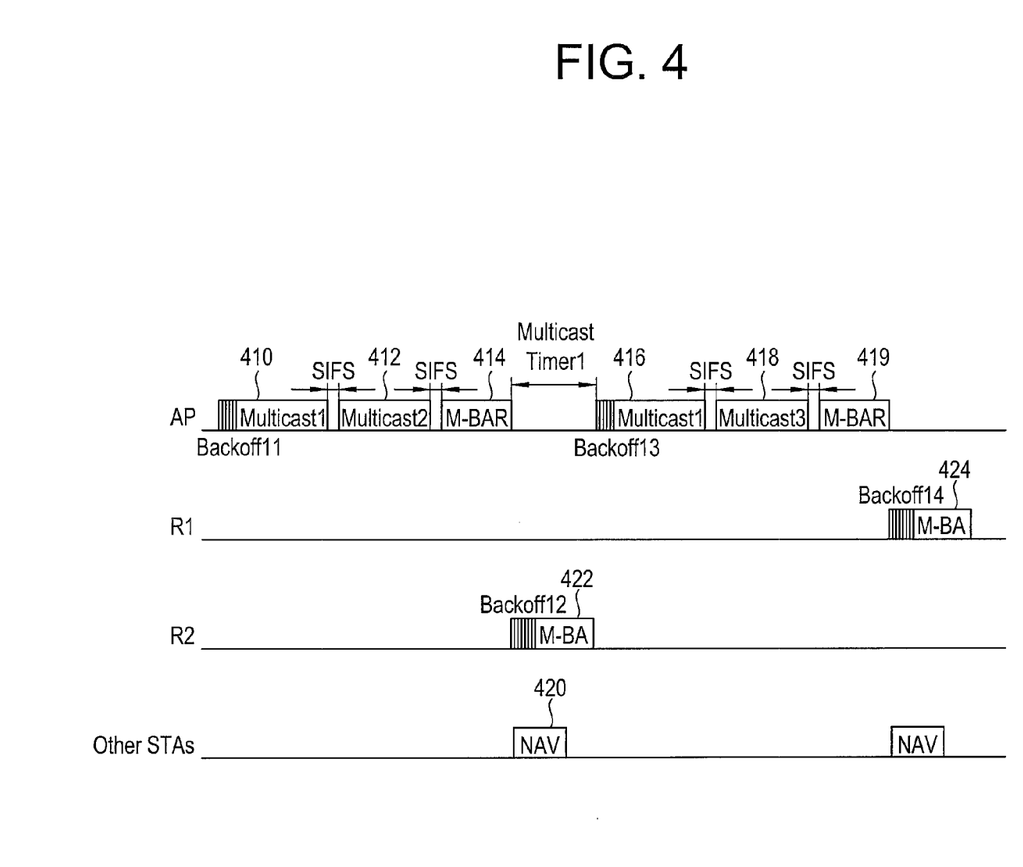
FIG. 4 is a timing diagram illustrating a receiver initiated multicast transmission procedure in a delay insensitive application according to an embodiment of the present invention.

FIG. 4 is a timing diagram illustrating a receiver initiated multicast transmission procedure in the delay insensitive application according to an embodiment of the present invention. FIG. 4 illustrates the process in which the multicast originator sequentially transmits two data frames during a transmission opportunity (TXOP) and then checks for a block ACK, which is, however, merely illustrative for the sake of brevity.

First, the multicast originator AP multicasts the first data frame Multicast1 410 after a backoff (Backoff11) of certain time duration. The first data frame Multicast1 410, which corresponds to one-time transmission unit of the multicast stream, may be a single data frame or a frame obtained by adding a plurality of data frames according to a method such as an aggregation or the like. And then, after a certain inter-frame interval, e.g., a short inter-frame space (SIFS), the AP multicasts the second data frame Multicast2 412. An acknowledgement (ACK) policy of the first and second data frames is set as a block ACK.

In order to check whether or not the multicast receivers (R1 and R2) have successfully received the first and second data frames, the AP transmits a multicast block ACK request (M-BAR) frame 414 to the multicast receivers (R1 and R2) after the certain interval, e.g., the SIFS. The M-BAR frame 414 may be transmitted in a unicast manner or broadcast manner. When the multicast receivers receive the M-BAR frame 414, they respond by a multicast block ACK frame. The multicast ACK frame is used to inform about a lost multicast frame. Thus, if all the multicast data frames are successfully received without having any lost data frame, the multicast receivers do not transmit the multicast block ACK frame to the multicast originator.

Figure 5:
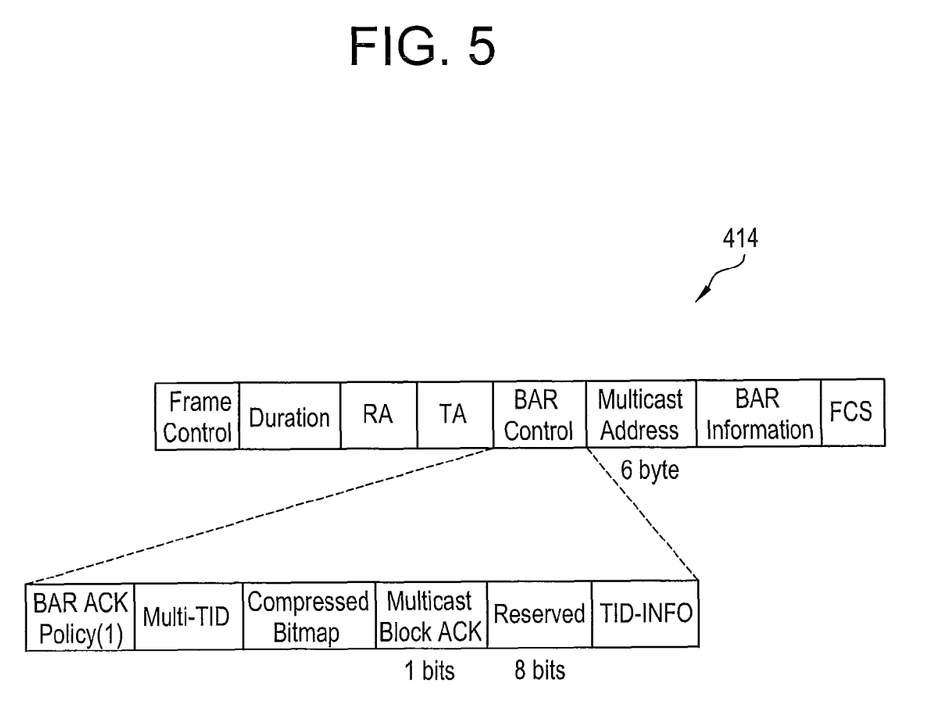
FIG. 5 illustrates an example of a format of a Multicast Block Acknowledgement (ACK) request (M-BAR) frame according to an embodiment of the present invention.

FIG. 5 illustrates an example of the format of the M-BAR frame according to an embodiment of the present invention. The M-BAR frame 414 may include one or more of a Frame Control field, a Duration field, a receiver address (RA) field, a target address (TA), a block ACK request (BAR) Control field, a Multicast Address field, a BAR Information field, and a frame check sequence (FCS) field. The BAR Control field may include one or more of a BAR ACK Policy subfield, a Multi-traffic indicator (TID) subfield, a Compressed Bitmap subfield, a Multicast Block ACK subfield, and a TID-information (INFO) subfield. A reserved field of 8 or less bits may also be included in the BA control field.

The Duration field in the M-BAR frame may be set as a value, not zero (0). The value of the Duration field may be used for two purposes. First, for the other STAs than the receivers (R1 and R2) of the multicast frame, the value of the Duration field is used to inform the other STAs about a NAV 420. Thus, the other STAs cannot access a channel during this period. Meanwhile, for the receivers R1 and R2 of the multicast frame, the value of the Duration field is used to inform the receivers R1 and R2 about the size of a contention window for transmitting a negative ACK frame.

The M-BAR frame 414 may or may not include the Multicast Address field. The Multicast Address field may be used to identify multicast receivers that are requested to respond with an acknowledgement (e.g., for the data frames or stream identified by the RA field) when the M-BAR frame 414 is transmitted in a multicast manner. The Multicast Address field may or may not be 6 bytes and may be positioned after the BAR Control field.

Alternatively, the RA field of the M-BAR frame 414 may include an individual address of the recipient STA or a group address. The multicast address field may be optional and therefore may only be included in the M-BAR frame 414 if the RA field is a group address. If the RA field is a group address, then the multicast address field may be used to uniquely identify a list of STAs (within the group address) that are requested to respond with an acknowledgement frame.

The M-BAR frame 414 may indicate that the corresponding frame is related to a multicast ACK request. The BAR Control field in the M-BAR frame 414 may include a multicast block ACK subfield or a multicast block ACK bit field. For example, the multicast block ACK bit field (a.k.a. a Most Reliable Groupcast (MRG) field) is set as one (1), which indicates that the corresponding frame is the M-BAR frame. Alternatively, the multicast block ACK bit field may indicate whether or not the M-BAR frame 414 is addressed to an individual non-AP STA or to a group of non-AP STAs.

After the AP multicasts the plurality of data frames (Multicast1 410 and Multicast2 412), for the purposes of explanation only, one may assume that the receiver R1 has successfully received the plurality of data frames (Multicast1 410 and Multicast2 412), the receiver R2 has not successfully received the plurality of data frames (Multicast1 410 and/or Multicast2 412), and the other STAs are not the receivers of the plurality of data frames (Multicast1 410 and Multicast2 412).

First, as an option, the other STAs set the value of the Duration field in the data frames 410 and 412, as the NAV. Thus, the other STAs do not attempt channel access during the period. The receiver R1 that has successfully received the data frames 410 and 412 extracts a multicast address, a sequence number, a traffic identifier (TID), and the like, from the data frames 410 and 412 and stores them in a temporary memory (i.e., cache) and the like. The receiver R2 that has not successfully received the entirety or a portion of the data frames 410 and 412, when it determines that a channel is available (optionally after a backoff of certain time duration), transmits a negative ACK frame, e.g., the multicast block ACK (M-BA) frame 422, to the AP, the multicast originator.

In one embodiment, only negative ACKs are sent to reduce unnecessary overhead. Here, failure to receive a negative ACK can be considered to be indication that the frames were successfully received. Alternatively, only positive ACKs are sent to reduce unnecessary overhead. Here, failure to receive a positive ACK can be considered to be indication that the frames were not successfully received.

Alternatively, the multicast block ACK field of FIG. 6 (described below) may be used to indicate a negative or positive ACK.

In case where one or more stations have not successfully received the multicast data frame, the multicast receivers may perform backoff (Backoff12) before transmitting the M-BA frame 422 in order to prevent collision between the transmitted M-BA frames. The contention window for backoff may not exceed the value set in the Duration field in the M-BA frame 422. Transmission priority of the M-BA frame 422 may be set to be the highest compared with other frames.

For example, when a non-AP STA receives a M-BAR frame with an RA having a group address that includes the non-AP STA, and with the non-AP STA's unique identifier listed in the multicast address field of the M-BAR frame, the non-AP STA may determine that an acknowledgment is requested. Conversely, if a non-AP STA receives a M-BAR frame with an RA having a group address that includes the non-AP STA, and without the non-AP STA's unique identifier listed in the multicast address field of the M-BAR frame, the non-AP STA may determine that an acknowledgment is not requested. If an acknowledgement is requested of the non-AP STA, the non-AP STA may then determine a corresponding STA order number, N, with the value of N of the lowest unique identifier listed in the multicast address field of the M-BAR frame being set to equal 0. Accordingly, the non-AP STA may transmit a corresponding M-BA frame after a delay of $(N+1)*SIFS+N*TxTIME$ (M-BA) after the M-BA frame, where TxTIME (M-BA) is a predetermined M-BA transmit time of the N=0 non-AP STA that may or may not vary uniformly with the system's PHY rate.

Figure 6:
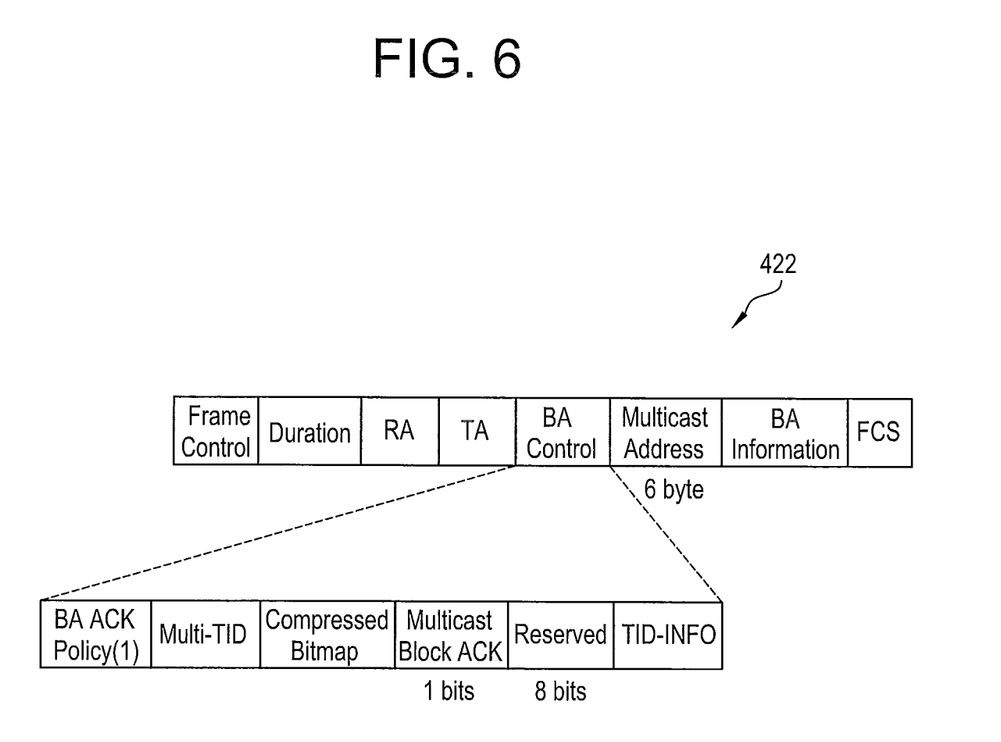
FIG. 6 illustrates an example of a format of a Multicast Block ACK (M-BA) frame according to an embodiment of the present invention.

FIG. 6 illustrates an example of the format of the M-BA frame. The M-BA frame 422 may include one or more of a Frame Control field, a Duration field, an RA field, a TA field, a BA Control field, a Multicast Address field, a BA information field, and an FCS field. The BA control field may include one or more of a BA Ack Policy subfield, a Multi-TID subfield, a Compressed Bitmap subfield, a Multicast Block Ack subfield, and a TID-INFO subfield. A reserved field of 8 or less bits may also be included in the BA control field.

Information for identifying the multicast data, namely, the plurality of data frames (Multicast1 410 and Multicast2 412) that are subjected to a retransmission request, may be included in the M-BA frame 422. For example, the M-BA frame 422 for triggering the multicast retransmission may use the Multicast Address field, and a corresponding multicast address may be set in this field. For example, the Multicast Address may be positioned after the BA Control field (e.g., immediately after as illustrated).

However, it is not necessary to identify the plurality of data frames (Multicast1 410 and Multicast2 412) that are subjected to a retransmission request. It is also possible to use the Multicast Address field for another purpose (e.g., to identify the group address corresponding to the acknowledgement address). It is also possible to merely include padding data in the multicast address field. It is possible to use the multicast block ACK field to indicate whether or not meaningful data is included in the multicast address field.

The M-BA frame 422 may include information for indicating that the corresponding frame is the M-BA frame. For example, the BA Control field in the M-BA frame 422 may use the BA ACK policy field, the multicast block ACK subfield or a multicast block ACK bit field to indicate that the corresponding frame is the M-BA frame. For example, if a corresponding frame is the M-BA frame, the BA ACK policy field or the multicast block ACK bit field may be set as '1'. Alternatively, the multicast block ACK bit field may be used to indicate a positive or negative ACK.

In one embodiment, when the multicast block ACK bit field (a.k.a. the MRG field) of the M-BAR frame 414 is set to 1, a receiving station can determine that the M-BAR frame 414 is sent to a group address rather than a specific address, with the a group address found in the RA field of M-BAR frame 414 and with specific non-AP STAs identified in the multicast address field of the M-BAR 414. Accordingly, the multicast block ACK (M-BA) frame 422 is sent in response, with the same group address in the multicast address field of the M-BA frame 422, and (optionally) the multicast block ACK field set to 1. The RA field of the M-BA frame 422 is the address of the recipient STA that requested the M-BA frame. The TA field is the address of the STA transmitting the M-BA frame.

If multicast block ACK bit field of M-BAR frame 414 is set to 0, a receiving station can determine that the M-BAR frame 414 is sent to specific address rather than a group address, with the specific address found in the RA field of M-BAR frame 414 and with the multicast address field not included in the M-BAR 414. Accordingly, the multicast block ACK (M-BA) frame 422 is sent in response, with the multicast address field not included in the M-BA frame 422, and (optionally) the multicast block ACK field set to 0. The RA field of the M-BA frame 422 is the address of the recipient STA that requested the M-BA frame. The TA field is the address of the STA transmitting the M-BA frame.

During the backoff if any other STA first accesses the channel to transmit the M-BA frame before the station R2 transmits the M-BA frame 422, transmission of the M-BA frame 422 on the backoff is canceled. And the station R2 may perform backoff again to transmit the M-BA frame 422 to the multicast originator within the period (i.e., period set in the Duration field) of the contention window.

After transmitting the M-BAR frame 414, the AP, namely, the multicast originator, may set a multicast timer (Multicast Timer1) having a certain value. The multicast timer may be for setting a time duration until when a plurality of next data frames start to be transmitted after the M-BAR frame 414 has been transmitted. The multicast timer (Multicast Timer1) may correspond to the sum of a value set in the Duration field of the M-BAR frame 414 and an interval between frames, e.g., a short inter-frame space (SIFS).

Referring back to FIG. 4, after the multicast timer (Multicast Timer1) expires, the AP may transmit the plurality of next data frames (Multicast1 and Multicast3). The plurality of data frames (Multicast1 416 and Multicast3 418) may be the same entirely or partially as or may be completely different from the plurality of data frames previously transmitted. As illustrated, it is assumed that the entirety or a portion of the previously transmitted data frames is retransmitted takes place when the M-BA frame 422 requesting retransmission of the multicast data (Multicast1 410 and/or Multicast2 412) is received from the receiver R2, before the multicast timer (Multicast Timer1) expires. After transmitting the first and second multicast frames (Multicast1 410 and Multicast2 412), the AP received the M-BA frame 422 requesting of the first data frame Multicast1 410. Thus the AP multicasts again the first data frame Multicast1 416 after a certain backoff (Backoff13) after the multicast timer (Multicast Timer1) expires. And then, the AP multicasts the third data frame Multicast3 418.

After the AP retransmits the first data frame Multicast1 416 and also the third data frame Multicast3 418, the AP transmits an M-BAR frame 419 having a certain value set in the Duration field. The value set in the Duration field is a value to be set as a second multicast timer (Multicast Timer2). And then, if the M-BA frame is not received from the multicast receivers during a certain time (i.e., a set time of the second multicast timer (Multicast Timer2), the AP performs backoff during a certain time and then multicasts a plurality of next data frames (e.g., Multicast4 and Multicast5 which are not in FIG. 4). Namely, after the second multicast timer (Multicast Timer2) expires, the AP multicasts the next data frames according to the general procedure.

The first receiver R1 which fails to successfully receive the entirety or a portion of the multicast data frames (Multicast1 416 and Multicast3 418) may transmit a M-BA frame 424 requesting retransmission to the AP, the multicast originator, after a backoff (Backoff14) is illustrated, but this process is merely illustrative. When the AP receives the M-BA frame 424 from the first receiver R1, the AP may multicast again the plurality of data frames including the requested frame (e.g., Multicast3) after a certain backoff.

Setting of Receiver Address (RA) of Retransmission Multicast Frame

A RA field in a retransmitted data frame (i.e., multicast frame) may be set as a special retransmission multicast group address, rather than the original multicast group address. The special retransmission multicast group address may have a one-to-one correspondence relation with the original multicast group address. The reason for using the special retransmission multicast group address different from the existing multicast group address is that there may coexist a legacy station. Since the legacy station has not joined the special retransmission multicast group address, the legacy station discards all the retransmitted multicast frames.

Figure 7:
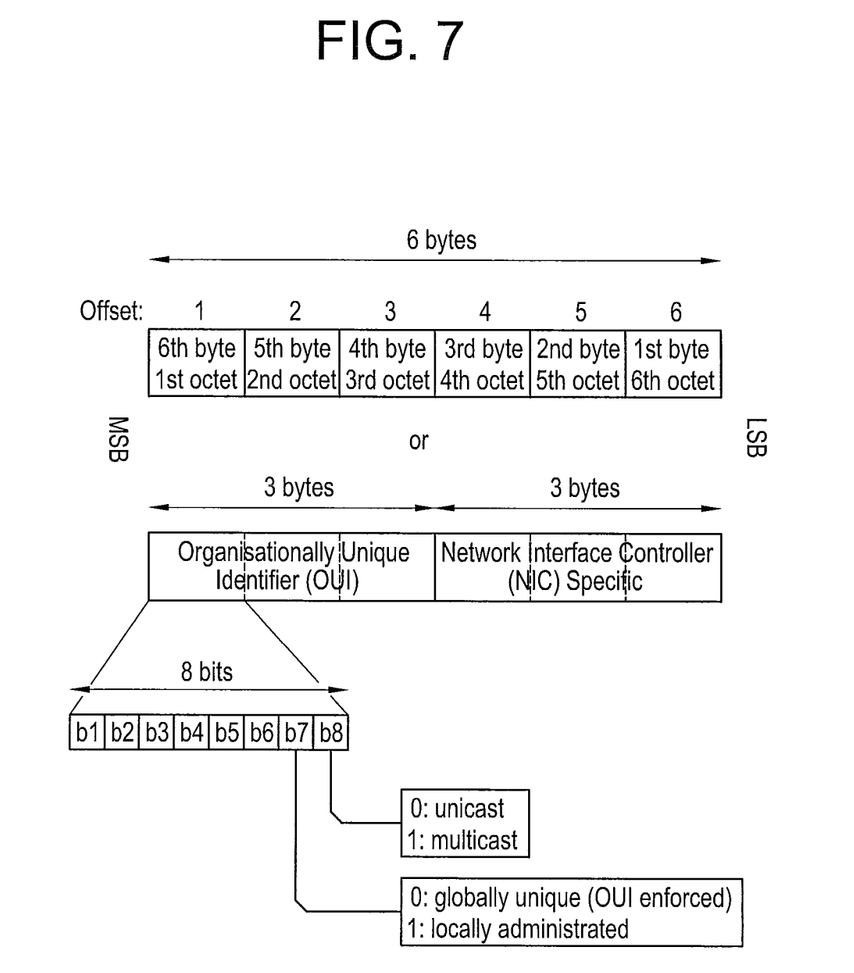
FIG. 7 illustrates an example of an Ethernet address format according to an embodiment of the present invention.

As the special retransmission multicast group address, an existing local multicast group address may be used. FIG. 7 illustrates an example of an Ethernet address format according to an embodiment of the invention. For example, in the special retransmission multicast group address, a b7 bit of most significant bit (MSB) may be set as '1' so as to be changed to the local multicast group address. The local multicast group address changed in this manner cannot collide with any other globally unique multicast group addresses.

In order to provide a protection scheme for the multicast frames, an exchange of RTS (request-to-send)/CTS (clear-to-send) frames and/or a CTS-to-Self frame may be used. In case of using the exchange of the RTS/CTS frames, the AP transmits an RTS frame to arbitrary multicast receivers before a multicast transmission. The multicast receivers, which have received the RTS frame, respond by a CTS frame. In case of using the CTS-to-Self frame, the AP transmits a CTS-to-Self frame before a multicast transmission. The RA field in the CTS-to-Self frame may be set as a multicast address or the address of the AP.

Figure 8:
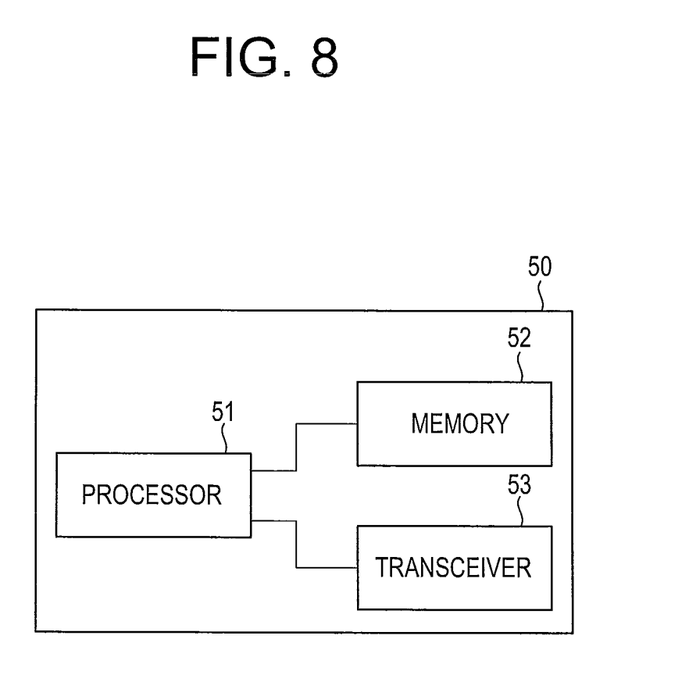
FIG. 8 illustrates an exemplary transceiver that may be either a mobile terminal or a base station according to an embodiment of the present invention.

FIG. 8 is a block diagram showing constitutional elements of a device 50 (mobile terminal or base station), that can be either an AP STA or non-AP STA of FIG. 1, and that can perform the methods described above. Device 50 includes a processor 51, a memory 52, and a transceiver 53. The processor 51 may implement the methods described above. The memory 52 is coupled to the processor 51 and stores various parameters. The transceiver 53 is coupled to the processor 51 and transmits and/or receives frames.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for transmitting multicast data in a wireless local area network (WLAN), the method comprising:
   transmitting, by an access point (AP) station of the WLAN, a group addressed frame including a multicast address based on a multicast transmission scheme to a plurality of non-AP stations of the WLAN including a first receiving station and a second receiving station;
   after transmitting the group addressed frame, transmitting, by the AP station of the WLAN, a first block acknowledgement request (BAR) frame based on a unicast transmission scheme to the first receiving station, wherein the first BAR frame is used to request an acknowledgement of the group addressed frame from the first receiving station;
   receiving, by the AP station of the WLAN, a first block acknowledgement (BA) frame indicating an acknowledgement for the group addressed frame from the first receiving station;
   after receiving the first BA frame, transmitting, by the AP station of the WLAN, a second BAR frame based on the unicast transmission scheme to the second receiving station, wherein the second BAR frame is used to request an acknowledgement of the group addressed frame from the second receiving station; and
   receiving, by the AP station of the WLAN, a second BA frame indicating an acknowledgement for the group addressed frame from the second receiving station.

2. The method of claim 1, wherein the first BAR frame includes a BAR control field including a multi-traffic indicator subfield, which is directly followed by a compressed bitmap subfield, which is directly followed by a multicast block acknowledgement subfield, and
   wherein the multicast block acknowledgement subfield is set to '1' to indicate that a frame carrying the first BAR is used to request a block acknowledgement of the first receiving station.

3. The method of claim 1, wherein the first BA frame includes a BA control field including a multi-traffic indicator subfield, which is directly followed by a compressed bitmap subfield, which is directly followed by a multicast block acknowledgement subfield, and
wherein the multicast block acknowledgement subfield is set to '1' to indicate that a frame carrying the first BA frame is used to report block acknowledgement of the first receiving station.

4. An access point (AP) station for transmitting multicast data in a wireless local area network (WLAN), the AP station comprising:
a radio frequency (RF) unit configured to transmit a radio signal; and
a processor configured to:
transmit a group addressed frame including a multicast address based on a multicast transmission scheme to a plurality of non-AP stations of the WLAN including a first receiving station and a second receiving station,
after transmitting the group addressed frame, transmit a first block acknowledgement request (BAR) frame based on a unicast transmission scheme to the first receiving station, wherein the first BAR frame is used to request an acknowledgement of the group addressed frame from the first receiving station,
receive a first block acknowledgement (BA) frame indicating an acknowledgement for the group addressed frame from the first receiving station,
after receiving the first BA frame, transmit a second BAR frame based on the unicast transmission scheme to the second receiving station, wherein the second BAR frame is used to request an acknowledgement of the group addressed frame from the second receiving station, and
receive a second BA frame indicating an acknowledgement for the group addressed frame from the second receiving station.

5. The AP station of claim 4, wherein the first BAR frame includes a BAR control field including a multi-traffic indicator subfield, which is directly followed by a compressed bitmap subfield, which is directly followed by a multicast block acknowledgement subfield, and
wherein the multicast block acknowledgement subfield is set to '1' to indicate that a frame carrying the first BAR is used to request block acknowledgement of the first receiving station.

6. The AP station of claim 4, wherein the second BA frame includes a BA control field including a multi-traffic indicator subfield, which is directly followed by a compressed bitmap subfield, which is directly followed by a multicast block acknowledgement subfield, and
wherein the multicast block acknowledgement subfield is set to '1' to indicate that a frame carrying the BA frame is used to report block acknowledgement of the first receiving station.

* * * * *